(12) United States Patent
Kojima

(10) Patent No.: US 8,713,236 B2
(45) Date of Patent: Apr. 29, 2014

(54) MAINTENANCE GUIDANCE DISPLAY DEVICE, MAINTENANCE GUIDANCE DISPLAY METHOD, AND MAINTENANCE GUIDANCE DISPLAY PROGRAM

(75) Inventor: Kazumi Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1078 days.

(21) Appl. No.: 12/187,764

(22) Filed: Aug. 7, 2008

(65) Prior Publication Data
US 2008/0300828 A1 Dec. 4, 2008

Related U.S. Application Data

(63) Continuation of application No. PCT/JP2006/303293, filed on Feb. 23, 2006.

(51) Int. Cl.
*H05K 7/10* (2006.01)
(52) U.S. Cl.
USPC .......................................... 710/301; 710/302
(58) Field of Classification Search
USPC .................................. 710/301–302; 713/300
See application file for complete search history.

(56) References Cited

U.S. PATENT DOCUMENTS

| | | | |
|---|---|---|---|
| 5,815,647 A * | 9/1998 | Buckland et al. ................. | 714/3 |
| 5,943,482 A * | 8/1999 | Culley et al. .................... | 710/302 |
| 5,956,665 A * | 9/1999 | Martinez et al. ............... | 702/188 |
| 6,158,618 A | 12/2000 | Mercer | |
| 6,167,352 A * | 12/2000 | Kanevsky et al. .............. | 702/81 |
| 6,718,472 B1 | 4/2004 | Garnett | |
| 7,512,894 B1 * | 3/2009 | Hintermeister et al. ....... | 715/771 |
| 7,669,064 B2 * | 2/2010 | Johnson et al. ................ | 713/300 |
| 2001/0034830 A1 | 10/2001 | Seki et al. | |
| 2004/0199696 A1 * | 10/2004 | Chari et al. .................... | 710/302 |
| 2005/0283694 A1 * | 12/2005 | Shabib et al. .................. | 714/733 |

FOREIGN PATENT DOCUMENTS

| | | |
|---|---|---|
| CN | 1527199 | 9/2004 |
| JP | 9-101909 | 4/1997 |
| JP | 09-101909 | 4/1997 |
| JP | 11-136388 | 5/1999 |

OTHER PUBLICATIONS

International Search Report dated Apr. 6, 2006 in corresponding PCT Application No. PCT/JP2006/303293 (9 pages).
First Notification of Office Action, mailed Jul. 24, 2009, in corresponding Chinese Application No. 20060047147.X (14 pp.).

(Continued)

*Primary Examiner* — Nimesh G Patel
(74) *Attorney, Agent, or Firm* — Staas & Halsey LLP

(57) ABSTRACT

Maintenance guidance is provided so that maintenance work is carried out without distinguishing operating state replacement/non-operating state replacement, faulty component replacement/preventive maintenance replacement, or replacement/expansion, and that an operator can carry out maintenance work without operation errors. To achieve such maintenance guidance, there are included: a component selection screen display unit that displays a plurality of components which can be maintenance targets, to allow the operator to select a maintenance target component; a state determination unit that determines a power state or an installation state of the maintenance target component selected by the selection screen display unit; and an instruction screen display unit that gives an instruction to carry out maintenance work in accordance with the determination state determined by the state determination unit.

12 Claims, 7 Drawing Sheets

(56) References Cited

OTHER PUBLICATIONS

International Preliminary Report on Patentability, mailed Aug. 26, 2008, in corresponding International Application No. PCT/JP2006/303293 (5 pp.).

Extended European Search report, mailed Nov. 2, 2009, in corresponding European Application No. 06714433.7 (6 pp.).

Watanuki, M., *Digital Camera Application Course—Basis of Digital Camera Application*(2), Nikkei Pascom, Apr. 15, 2002, No. 407, pp. 149-152 (6 pages including English Abstract).

Watanuki, M., *Digital Camera Application Course—Basis of Digital Camera Application*(2), Nikkei Pascom, Apr. 15, 2002, No. 407, pp. 149-152 (6 pp.).

* cited by examiner

```
Please confirmed ReadyLED has been turned off and CheckLED has been blinked.
After that, please replace CMU#1.
Please input "f" when the replace of CMU#1 finish. (f:finish):
```

```
Please replace CMU#3.
Please input "f" when the replace of CMU#3 finish. (f:finish):
```

FIG. 8 RELATED ART

```
machine1  System-Specific Administration
Maintenance/Swapping Administration 1. Faulty Component Replacement (Hot Swap)
 2. Preventive Maintenance (Hot Swap)
 3. Hot System Expansion
 4. Cold System Maintenance (Breaker On)
 5. Cold System Maintenance (Breaker Off)
 6. Cold System Control Facility (SCF) Maintenance (Breaker Off)
 7. CPU Clock Frequency Administration WARNING: This operation should be performed by trained service
         personnel only.

q:Quit b:Back to previous menu t:Go to top menu h:Help
-----------------------------------------------------------------
Select. (1-7, q, b, t, h) : 1
```

FIG. 9    RELATED ART

```
machine1  System-Specific Administration
Faulty Component Replacement (Hot Swap)

1. FAN       (Fan Tray)
2. FEP       (System Power Supply)
3. CONV      (Converter)
4. SCF-CO    (Panel Control Board)
5. OP-PANEL  (Operator Panel)
6. SCF       (System Control Facility)

Please select component type to replace.

q:Quit b:Back to previous menu t:Go to top menu h:Help
_____

Select. (1-6, q, b, t, h):
```

FIG. 10    RELATED ART

```
No faulty components were found.

Faulty component replacement discontinued.
Press the return key:
```

MAINTENANCE GUIDANCE DISPLAY DEVICE, MAINTENANCE GUIDANCE DISPLAY METHOD, AND MAINTENANCE GUIDANCE DISPLAY PROGRAM

TECHNICAL FIELD

This application is a continuation application filed under 35 U.S.C. §111(a), of international Application No. PCT/JP2006/303293, the disclosure of which is herein incorporated in its entirety by reference. The present invention relates to a maintenance guidance display device, a maintenance guidance display method, and a maintenance guidance display program for giving guidance to an operator about a maintenance work for a system.

BACKGROUND ART

As types of maintenance work, there are operating state replacement by which replacement is carried out with a power source switched on, and non-operating state replacement by which replacement is carried out with the power source switched off. Conventional maintenance guidance display devices adopt a method for asking beforehand an operator to select either "operating state replacement" or "non-operating state replacement" from a menu, depending on states of a power source, before carrying out maintenance work.

Also as types of maintenance work, there are faulty component replacement by which a faulty component is replaced, and preventive maintenance replacement by which replacement is carried out before a trouble occurs. Regarding these types of maintenance work, conventional maintenance guidance display devices adopt a method for asking an operator to select either "faulty component replacement" or "preventive maintenance replacement" from a menu before carrying out maintenance work.

Also as types of maintenance work, there are a case of replacing components and a case of an expansion. Regarding these types of maintenance work, conventional maintenance guidance display devices adopt a method for asking an operator to select either "replacement" or "expansion" from a menu before carrying out maintenance work.

FIG. 8 shows a conventional menu screen. Owing to FIG. 8, it is possible to simultaneously determine types of a replacement method as described above on one menu screen, i.e., either "operating state replacement" or "non-operating state replacement", either "faulty component replacement" or "preventive maintenance replacement", and either "replacement" or "expansion".

In conventional maintenance work, a component to be replaced or so is selected as shown in FIG. 9 after selecting a replacement method on the menu screen shown in FIG. 8.

DISCLOSURE OF THE INVENTION

Problems to be Solved by the Invention

Since conventional maintenance guidance display devices have a configuration as described above, operators need to work distinguishing beforehand operating state replacements, which allows replacements when the system is active, from non-operating state replacements, by which replacements are carried out after stopping the system. For example, if "operating state replacement" is selected for a component to be subjected to "non-operating state replacement", the screen shown in FIG. 9 is shown up next. Then, the component to be subjected to "operating state replacement" cannot be found any more.

Therefore, an operator needs to recognize a power source state of each part of the system and to select a maintenance method depending on the power source state, before stating maintenance work. However, there is a case that which maintenance method to select is difficult to determine.

Also regarding faulty component replacements and preventive maintenance replacements, if faulty component replacement is selected by mistake in place of preventive maintenance replacement in conventional maintenance guidance display devices, components as targets for preventive maintenance replacement cannot be selected since a component selection screen as shown in FIG. 9 shows only components as targets which can be subjected to faulty component replacement. This complicates maintenance work.

Further, if a maintenance guidance program is quitted with a component detached by mistake after replacement in conventional maintenance guidance display devices, the component is left detached and maintenance work needs to be carried out again. At this time, the component is left detached. Therefore, guidance for carrying out "replacement" cannot be activated but "expansion" guidance needs to be used inevitably. In this case, even if "replacement" is cancelled or (terminated), an "expansion" needs to be carried out in order to restart processing. This complicates maintenance work in some cases.

If a contradiction occurs in a series of selections, guidance as shown in FIG. 10 is displayed, and the maintenance work needs to be carried out again from the beginning, resulting in a problem of increased loss of working time.

The present invention has been made to solve the problems as described above, and has an object of providing a maintenance guidance display device with which maintenance work can be carried out without distinguishing operating state and non-operating state, so that an operator can complete maintenance work without being complicated to make operation errors. The present invention has another object of providing a maintenance guidance display device, a maintenance guidance display method, and a maintenance guidance display program, with which maintenance work can be carried out without distinguishing faulty component replacements and preventive maintenance replacements, so that an operator can complete maintenance work without being complicated to make operation errors. The present invention has a still another object of providing a maintenance guidance display device, a maintenance guidance display method, and a maintenance guidance display program, with which maintenance work can be carried out without distinguishing replacements and expansions, so that an operator can complete maintenance work without being complicated to make operation errors.

Means for Solving the Problems

To solve the problems described above, a maintenance work guidance display device according to one aspect of the present invention gives guidance to an operator about replacement or expansion of a component of a system for assisting maintenance work for the system, the device including a component selection screen display unit that displays a plurality of components which can be maintenance targets, to allow the operator to select a maintenance target component; a state determination unit that determines a power state regarding whether a power source is on or not for the maintenance target component selected by the component selection screen display unit, and an installation state regarding whether the maintenance target component selected is installed or not; a power source control unit that turns off the power source if the state determination unit determines the power source to be on; and an instruction screen display unit that gives an instruction to carry out maintenance work after the power source is turned off by the power source control unit if the power source is determined to be on by the state determination unit, or gives an instruction to immediately carry out maintenance work if the power source is determined to be not on or if the maintenance target component is determined to be not installed by the state determination unit.

Preferably in the maintenance work guidance display device according to the aspect of the present invention, if the state determination unit determines that the power source of the maintenance target component to be on, the instruction screen display unit gives an instruction to carry out maintenance work for the maintenance target component after confirming that the power source of the maintenance target component is turned off.

Also preferably in the maintenance work guidance display device according to the aspect of the present invention, if the state determination unit determines that the maintenance target component to be not installed, a message informing of an instruction about maintenance work, which is given by the instruction screen display unit, differs from a message in a case where the maintenance target component is installed.

Also preferably in the maintenance work guidance display device according to the aspect of the present invention, the installation state includes a normal state in which each of the components works normally or an abnormal state in which each of the components works abnormally, and the instruction screen display unit displays a display indication in accordance with the installation state when giving the instruction about maintenance work.

Also preferably, the maintenance work guidance display device according to the aspect of the present invention further includes a component type selection screen display unit that displays a plurality of component types which can be maintenance targets, to allow the operator to select a component type as a maintenance target, in which the component selection screen display unit displays a plurality of components for the component type selected by the component type selection screen display unit.

Also preferably, the maintenance work guidance display device according to the aspect of the present invention further includes a component state detection unit that detects the power source state and the installation state, for each of the components, in which the component selection screen display unit displays, together with the plurality of components, the power source state and the installation state which are detected for each of the components by the component state detection unit.

A maintenance work guidance display program according to another aspect of the present invention gives guidance to an operator about replacement or expansion of a component in a system, to help with maintenance work for the system, and causes a computer to execute: a component selection screen display step that displays a plurality of components which can be maintenance targets, to allow the operator to select a maintenance target component; a state determination step that determines a power state regarding whether a power source is on or not for the maintenance target component selected by the component selection screen display step, and an installation state regarding whether the maintenance target component selected is installed or not; and an instruction screen display step that gives an instruction to turn off the power source and then carry out maintenance work if the power source is determined to be on by the state determination step, or gives an instruction to immediately carry out maintenance work if the power source is determined to be not on or if the maintenance target component is determined to be not installed by the state determination step.

Preferably in the maintenance work guidance display program according to the another aspect of the present invention, if the power source of the maintenance target component is determined to be on by the state determination step, the instruction screen display step gives an instruction to carry out maintenance work for the maintenance target component after confirming that the power source of the maintenance target component is turned off.

Also preferably in the maintenance work guidance display program according to the another aspect of the present invention, if the maintenance target component is determined to be not installed by the state determination step, a message informing of an instruction about maintenance work, which is given by the instruction screen display step, differs from a message in a case where the maintenance target component is installed.

Also preferably in the maintenance work guidance display program according to the another aspect of the present invention, the installation state includes a normal state in which each of the components works normally or an abnormal state in which each of the components works abnormally, and the instruction screen display step displays a display indication in accordance with the installation state when giving the instruction about maintenance work.

Also preferably, the maintenance work guidance display program according to the another aspect of the present invention further includes a component type selection screen display step that displays a plurality of component types which can be maintenance targets, to allow the operator to select a component type as a maintenance target, in which the component selection screen display step displays a plurality of components for the component type selected by the component type selection screen display step.

Also preferably, the maintenance work guidance display program according to the another aspect of the present invention further includes a component state detection step that detects the power source state and the installation state, for each of the components, in which the component selection screen display step displays, together with the plurality of components, the power source state and the installation state which are detected for each of the components by the component state detection step.

A maintenance work guidance display method according to still another aspect of the present invention gives guidance to an operator about replacement or expansion of a component in a system, to help with maintenance work for the system, the method includes: a component selection screen display step that displays a plurality of components which can be maintenance targets, to allow the operator to select a maintenance target component; a state determination step that determines a power state regarding whether a power source is on or not for the maintenance target component selected by the component selection screen display step, and an installation state regarding whether the maintenance target component selected is installed or not; and an instruction screen display step that gives an instruction to turn off the power source and then carry out maintenance work if the power source is determined to be on by the state determination step, or gives an instruction to immediately carry out maintenance work if the power source is determined to be not on or if the maintenance target component is determined to be not installed by the state determination step.

According to still another aspect of the present invention, a work guidance method outputs guidance for work, and includes: a step that allows a work target component to be selected; a step that determines whether the work target component selected is powered on or off; and a step that outputs an instruction to turn off a power source which powers the work target component selected if the work target component is determined to be powered on.

According to still another aspect of the present invention, a work guidance method that outputs guidance for work, and includes: a step that allows a work target component to be selected; a step that determines whether the work target component selected is powered on or off; and a step that outputs an instruction to carry out the work on the work target component selected if the work target component is determined to be powered off.

According to still another aspect of the present invention, a work guidance method that outputs guidance for work, and includes: a step that allows a work target component to be selected; a step that determines whether the work target component selected is installed or not; and a step that outputs an instruction about the work on the work target component selected if the work target component is determined to be not installed.

BRIEF DESCRIPTION OF THE DRAWINGS

FIG. 8 shows a conventional screen which allows a selection of a component replacement method;

FIG. 9 shows a conventional component selection screen; and

FIG. 10 shows a conventional error message screen.

BEST MODE FOR CARRYING OUT THE INVENTION

Now, preferred embodiments of the present invention will be described by referring to the accompanying drawings.

Figure 1:
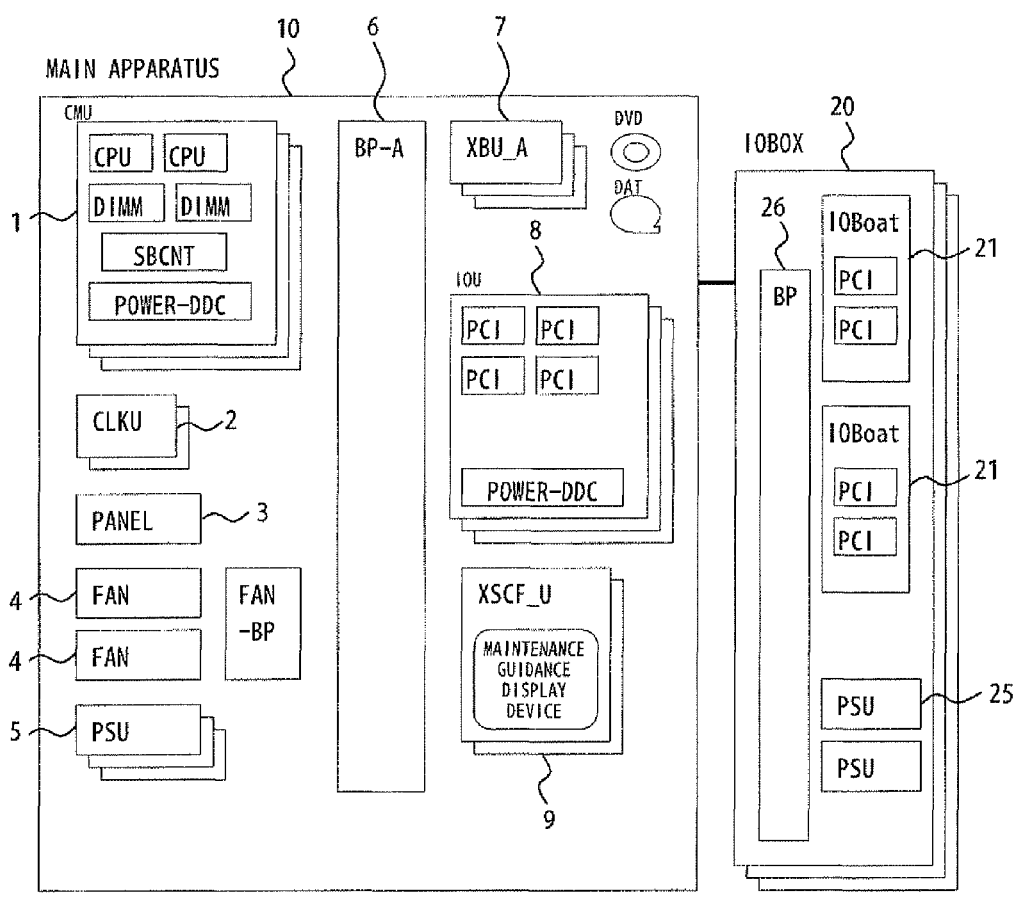
FIG. 1 is a block diagram showing an entire configuration of a system to which a maintenance guidance display device according to an embodiment of the present invention is applied.

FIG. 1 is a block diagram showing an entire structure of a system to which a maintenance guidance display device according to the embodiment of the present invention is applied. For example, this system is a server.

In the system shown in FIG. 1, a main apparatus 10 includes plural components which are classified into plural component types: CMUs 1 each of which includes CPUs, DIMMs, a system board controller, and a power converter; a clock board unit 2; a panel 3; fans 4; power supply units 5; a back panel 6; cross bar units 7; IO units 8 each of which includes PCIs and power converters. The main apparatus 10 also includes maintenance guidance display devices 9. The main apparatus 10 is connected to IO boxes each of which includes IO boats 21, power supply units 25, and a back panel 26.

Figure 2:
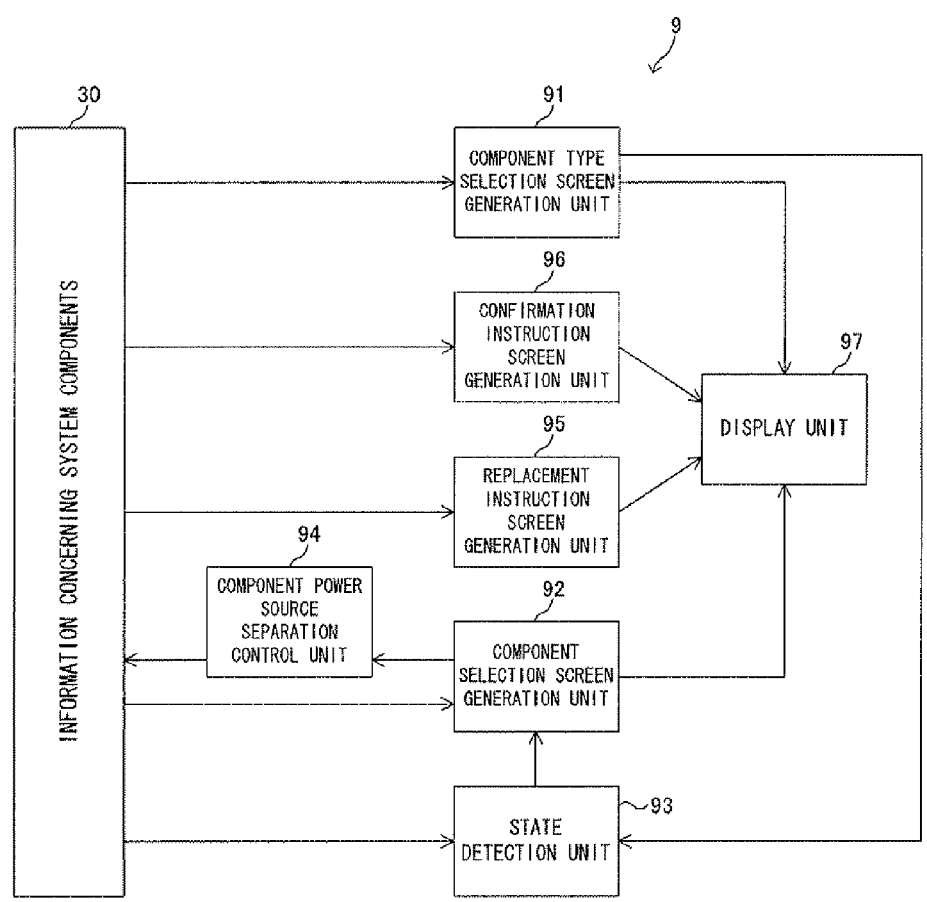
FIG. 2 is a block diagram showing the maintenance guidance display device according to the embodiment.

As shown in FIG. 2, the maintenance guidance display device 9 according to this embodiment includes: a component type selection screen generation unit 91 which generates a component type selection screen to be displayed, thereby to show plural component types extracted from respective component information items 30 of the system and to allow an operator to make a selection therefrom; and a component selection screen generation unit 92 which generates a component selection screen generation screen to be displayed, thereby to show plural components belonging to a component type selected on the component type selection screen, and to allow the operator to make a selection therefrom.

Further, the maintenance guidance display device includes: a state detection unit 93 which detects a power state and an installation state, as states of each component which are shown on the component selection screen, the power state indicating whether a component is powered on or off, and the installation state indicating whether a component works properly or not or whether a component is installed or not; a control unit 94 which powers off or physically separates the component selected on the component selection screen; a replacement instruction screen generation unit 95 which generates a replacement instruction screen to be displayed, thereby to present a replacement instruction to the operator; a confirmation instruction screen generation unit 96 for presenting, to the operator, a confirmation instruction after replacement; and a display unit 97 which displays the screens generated by the screen generation units 91, 92, 95, and 96.

In the configuration as described above, the component type selection screen generation unit 91 and the display unit 97 constituted a component type selection screen display unit, and the component selection screen generation unit 92 and the display unit 97 constitute a component selection screen display unit.

Figure 3:
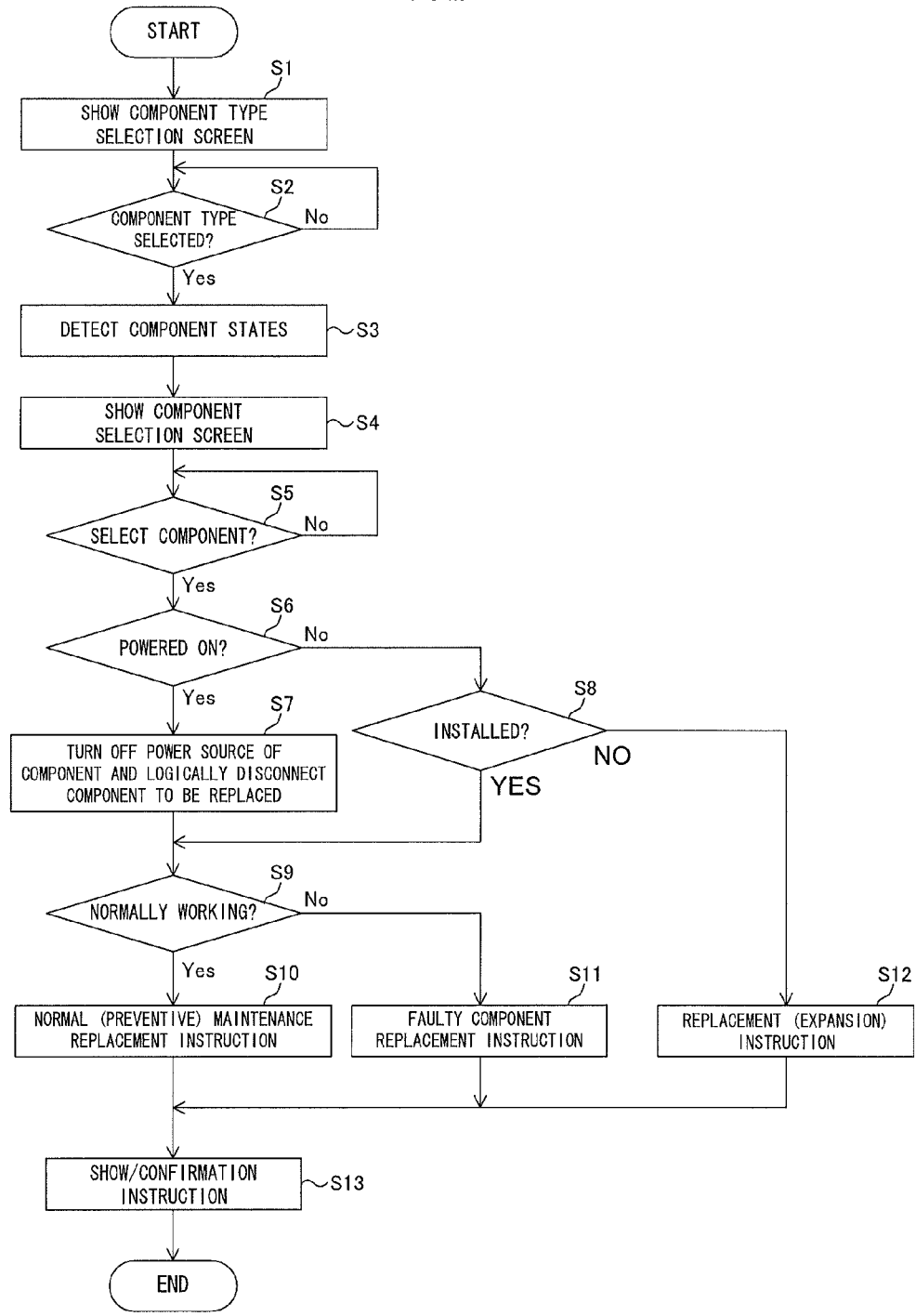
FIG. 3 is a flowchart showing operations according to the embodiment.
Figure 4:
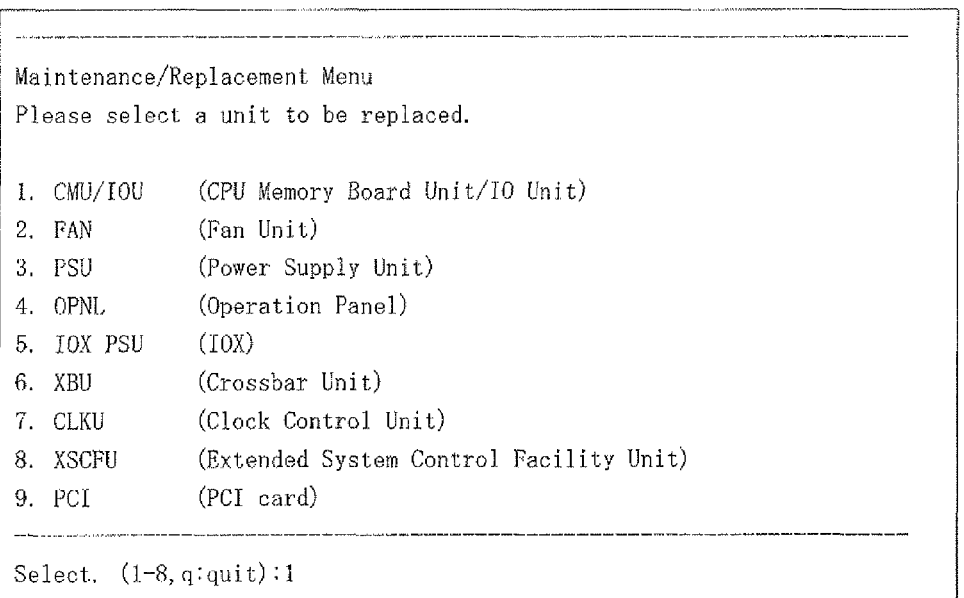
FIG. 4 shows a component type selection screen.

Hereinafter, operation of this embodiment will be described. FIG. 3 is a flowchart showing operation of this embodiment. At first, a component type selection screen as shown in FIG. 4 is displayed (step S1). On the component type selection screen, various component types and explanations thereof are presented as shown in FIG. 4, and at a lower part of the screen, an instruction is given to select a desired component type from the various component types.

Next, whether the selection has been made or not is determined (step S2). If selected (step S2, Yes), a component state is detected (step S3), and a component selection screen as shown in FIG. 5 is then displayed (step S4).

Figures 5, 6, 7:
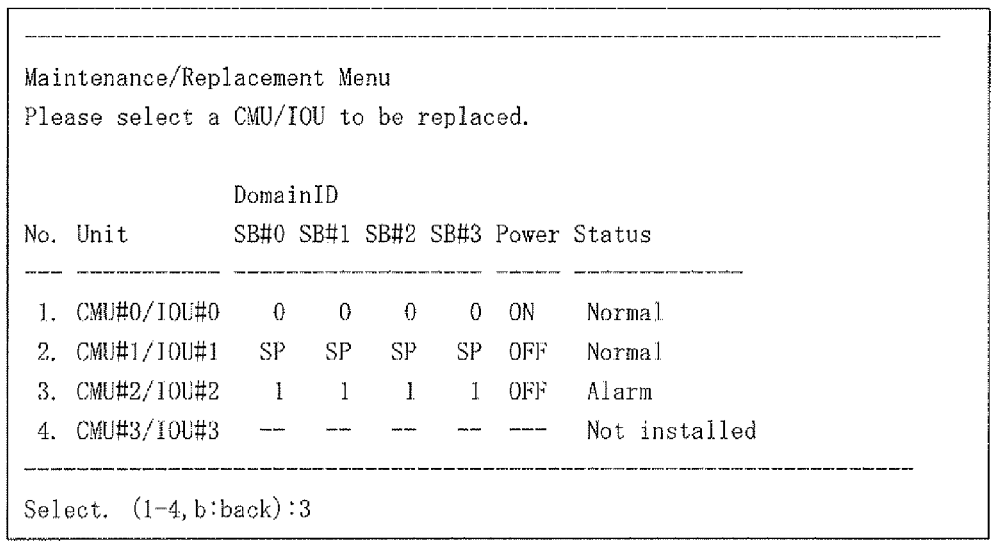
FIG. 5 shows a component selection screen.
FIG. 6 shows a component replacement instruction screen in replacement.
FIG. 7 shows a component replacement instruction screen in an expansion.

The component selection screen shown in FIG. 5 shows an example of a case where CMU/IOU denoted at "1." has been selected in FIG. 4 showing component types. On the component selection screen in FIG. 5, CPU (1. to 4.) as four components constituting a CMU are shown up. In addition, the component selection screen shows whether power states of the CPUs each are on or off, whether the CPUs each are working normally or abnormally (alarming), and whether the CPUs each are installed or not. These states have been obtained in step S3.

Next, whether or not a component which the operator is going to replace has been selected from the components shown in FIG. 5 is determined (step S5). If any of the components has been selected (step S5, Yes), whether the selected component is powered on or not is determined (step S6). If the power source of the selected component is determined to be on (step S6, Yes), the power source of the component is then turned off or the component is then logically disconnected (step S7).

Next, a state (an installation state) indicating whether the component works normally or abnormally is determined (step S9). If the component works normally (step S9, Yes), a replacement instruction (a preventive maintenance replacement instruction) to replace a normally working component as shown in FIG. 6 is displayed (step S10). Otherwise, if the component works abnormally (step S9, No), a replacement instruction to replace a faulty component is displayed (step S11). In a case of turning off the power source of the component in step S7, content of each of is the instructions displayed in steps S10 and S11 includes a message saying that replacement is carried out after confirming that the power source is turned off.

Although the figures do not show a displayed indication (or message) of a replacement instruction to replace a faulty component, it is possible to indicate that, for example, a corresponding component is a faulty component or corresponding work is faulty component replacement, in addition to the display indication shown in FIG. 6. Also it goes without saying that one display step (step S10) which shows a display as shown FIG. 6 can be substituted by step S9-step S11 without distinguishing faulty component replacements and preventive maintenance replacements.

On the other hand, if the power source of the component is determined to be off in step S6 (step S6, No), the processing flow goes to step S8, and whether the component is installed or not is determined. If installed (step S8, Yes), the processing flow goes to the step S9 described above. Otherwise, if not installed (step S8, No), a replacement instruction is given by a message different from those of steps S10 and S11 (step S12). In this case, a display indication (or message) is as shown in FIG. 7.

After a component is replaced through processings as described above, states of the component are shown up or a confirmation instruction is given (step S13). Then, operations end.

According to this embodiment, choices such as operating state replacement and non-operating state replacement are not displayed when carrying out maintenance work but maintenance processes are automatically instructed depending on states of a device. The operator can therefore replace a component without caring states of the power source of the component. Similarly, choices such as faulty component replacement and preventive maintenance replacement are not displayed when carrying out maintenance work but maintenance processes are automatically instructed depending on states of a component to be replaced. The operator can therefore replace a component without caring whether replacement is for a faulty component (faulty component replacement) or a normally working component (preventive maintenance replacement), as well.

If a normally working component is selected, an indication informing of preventive maintenance replacement may be displayed. Otherwise, if a faulty component is selected, an indication informing of faulty component replacement may be displayed.

The above example has described an example of a case shown in FIG. 5 where CMU#0/IOU#0 denoted at "1." is selected and a corresponding component is installed. However, the same flow processing is carried out in another case shown in FIG. 5 where a component denoted at "4.", which is not installed, is selected. In step S12, a replacement instruction is given with a different display indication from that in the case of an installed component (shown in FIG. 6), as shown in FIG. 7.

Accordingly, the operator can carry out replacement or expansion without caring whether a component is installed or not. In this configuration, even if a component is erroneously regarded as being not installed due to an operation error in replacement work, the operator can carry out maintenance for a component not installed by just continuing the replacement operation. Conventionally in this case, an expansion mode needs to return to the first menu and reselect an expansion mode to receive guidance. Therefore, disorders are reduced in maintenance work.

In the above embodiment of the present invention, steps shown in the flowchart of FIG. 3 may be stored as a maintenance guidance display program in a recording medium which is readable from a computer. Then, the computer can be caused to execute the maintenance guidance display function. In the present invention, such a recording medium readable from a computer includes a portable storage medium such as a CD-ROM, a flexible disk, a DVD, a magneto-optical disk, or an IC card, a database holding a computer program, another computer and a database thereof, or an on-line transfer medium.

INDUSTRIAL APPLICABILITY

According to the present invention, the following effects are obtained.

(1) Maintenance work can be carried out without distinguishing operating state replacement/non-operating state replacement, so that operators can complete maintenance work without operation errors.

(2) Maintenance work can be carried out without distinguishing faulty component replacement/preventive maintenance replacement, so that operators can complete maintenance work without operation errors.

(3) Maintenance work can be carried out without distinguishing replacement/expansion, so that operators can complete maintenance work without operation errors.

The invention claimed is:

1. A maintenance work guidance display device that gives guidance to an operator about replacement or expansion of a component of a system for assisting maintenance work for the system, the device comprising:

a component selection screen display unit that displays a plurality of components which can be maintenance targets, to allow the operator to select a maintenance target component;

a state determination unit that determines a power state regarding whether a power source is on or not for the maintenance target component selected by the component selection screen display unit, a first installation state regarding whether the maintenance target component selected is installed or not and a second installation state regarding whether the maintenance target component selected works normally or not;

a power source control unit that turns off the power source when the state determination unit determines the power source to be on; and an instruction screen display unit that gives one of an instruction to indicate that:

the maintenance work is a replacement of a normally working component and to carry out maintenance work after the power source is turned off by the power source control unit when the power source is determined to be on, the maintenance work is a faulty component replacement and to carry out maintenance work after the power source is turned off by the power source control unit when the power source is determined to be on when the maintenance target component selected is determined to be faulty by the state determination unit, and the maintenance work is an expansion and to immediately carry out maintenance work when the power source is determined to be not on and when the maintenance target component is determined to be not installed by the state determination unit, and a component state detection unit that detects the power source state and the first installation state and the second installation state, for each of the components, and wherein, the state determination unit determines whether the power source is ON, when determining the power source is not ON, the state determination unit determines whether the maintenance target component selected is installed, when determining the power source is ON or the maintenance target component selected is installed, the state determination unit determines whether the maintenance target component selected is faulty, and wherein the component selection screen display unit displays, together with the plurality of components, the power source state and the first installation state and the second installation state which are detected for each of the components by the component state detection unit.

2. The maintenance work guidance display device according to claim 1, wherein, when the state determination unit determines that the power source of the maintenance target component to be on, the instruction screen display unit gives an instruction to carry out maintenance work for the maintenance target component after confirming that the power source of the maintenance target component is turned off.

3. The maintenance work guidance display device according to claim 1, wherein the instruction screen display unit displays a display indication in accordance with the installation state when giving the instruction about maintenance work.

4. The maintenance work guidance display device according to claim 1, comprising:

a component type selection screen display unit that displays a plurality of component types which can be maintenance targets, to allow the operator to select a component type as a maintenance target, wherein the component selection screen display unit displays a plurality of components for the component type selected by the component type selection screen display unit.

5. A non-transitory computer-readable medium storing a maintenance work guidance display program that gives guidance to an operator about replacement or expansion of a component in a system, to help with maintenance work for the system, and causes a computer to execute an operation, comprising:

displaying a plurality of components which can be maintenance targets, to allow the operator to select a maintenance target component;

determining a power state regarding whether a power source is on or not for the maintenance target component selected from the displaying of the plurality of components, and a first installation state regarding whether the maintenance target component selected is installed or not and a second installation state regarding whether the maintenance target component selected works normally or not; and providing an instruction to turn off the power source and then carry out maintenance work when the power source is determined to be on, or providing an instruction to immediately carry out maintenance work when the power source is determined to be not on or when the maintenance target component is determined to be not installed, and detecting a component state including the power source state and the first installation state and the second installation state, for each of the components, and wherein the instruction indicates the maintenance work is a replacement of a normally working component and to carry out maintenance work after the power source is turned off by the power source, indicates the maintenance work is a faulty component replacement and to carry out maintenance work after the power source is turned off when the power source is determined to be on when the maintenance target component selected is determined to be faulty, and indicates the maintenance work is an expansion and to immediately carry out maintenance work when the power source is determined to be not on and when the maintenance target component is determined to be not installed, and wherein, the determining includes determining whether the power source is ON, when determining the power source is not ON, determining whether the maintenance target component selected is installed, when determining the power source is ON or the maintenance target component selected is installed, determining whether the maintenance target component selected is faulty, and wherein information of the plurality of components, the power source state and the installation state which are detected for each of the components is displayed.

6. The maintenance work guidance display program according to claim 5, wherein, when the power source of the maintenance target component is determined to be on, providing an instruction to carry out maintenance work for the maintenance target component after confirming that the power source of the maintenance target component is turned off.

7. The maintenance work guidance display program according to claim 5, wherein the installation state includes a normal state in which each of the components works normally or an abnormal state in which each of the components works abnormally, and a display indication is displayed in accordance with the installation state when giving the instruction about maintenance work.

8. The maintenance work guidance display program according to claim 5, comprising:

displaying a component type selection screen indicating a plurality of component types which can be maintenance targets, to allow the operator to select a component type as a maintenance target, and wherein a plurality of components for the component type selected is displayed.

9. A maintenance work guidance display method that gives guidance to an operator about replacement or expansion of a component in a system, to help with a maintenance work for the system, the method comprises:

displaying a plurality of components which can be maintenance targets, to allow the operator to select a maintenance target component;

determining a power state regarding whether a power source is on or not for the maintenance target component selected from the displaying of the plurality of components, and a first installation state regarding whether the maintenance target component selected is installed or not and a second installation state regarding whether the maintenance target component selected works normally or not; and providing an instruction to turn off the power source and then carry out maintenance work when the power source is determined to be on, or gives an instruction to immediately carry out maintenance work when the power source is determined to be not on or when the maintenance target component is determined to be not installed, and wherein the instruction indicates the maintenance work is a replacement of a normally working component and to carry out maintenance work after the power source is turned off by the power source, indicates the maintenance work is a faulty component replacement and to carry out maintenance work after the power source is turned off when the power source is determined to be on when the maintenance target component selected is determined to be faulty, and indicates the maintenance work is an expansion and to immediately carry out maintenance work when the power source is determined to be not on and when the maintenance target component is determined to be not installed; and detecting a component state including the power source state and the installation first installation state and the second state, for each of the components, wherein, the determining includes determining whether the power source is ON, when determining the power source is not ON, determining whether the maintenance target component selected is installed, when determining the power source is ON or the maintenance target component selected is installed, determining whether the maintenance target component selected is faulty, and wherein information of the plurality of components, the power source state and the installation state which are detected for each of the components is displayed.

10. The maintenance work guidance display method according to claim 9, wherein, when the power source of the maintenance target component is determined to be on, providing an instruction to carry out maintenance work for the maintenance target component after confirming that the power source of the maintenance target component is turned off.

11. The maintenance work guidance display method according to claim 9, wherein the installation state includes a normal state in which each of the components works normally or an abnormal state in which each of the components works abnormally, and a display indication is displayed in accordance with the installation state when giving the instruction about maintenance work.

12. The maintenance work guidance display method according to claim 9, comprising:

displaying a component type selection indicating a plurality of component types which can be maintenance targets, to allow the operator to select a component type as a maintenance target, wherein a plurality of components for the component type selected is displayed.

\* \* \* \* \*